United States Patent
Caputo et al.

(10) Patent No.: US 9,533,216 B2
(45) Date of Patent: Jan. 3, 2017

(54) GAMING SYSTEM AND METHOD FOR PROVIDING A MULTIPLE PLAYER GAME

(71) Applicant: IGT, Reno, NV (US)

(72) Inventors: Scott A. Caputo, Santa Clara, CA (US); Leandro Basallo, San Francisco, CA (US)

(73) Assignee: IGT, Las Vegas, NV (US)

( * ) Notice: Subject to any disclaimer, the term of this patent is extended or adjusted under 35 U.S.C. 154(b) by 389 days.

(21) Appl. No.: 13/625,943

(22) Filed: Sep. 25, 2012

(65) Prior Publication Data

US 2014/0087815 A1  Mar. 27, 2014

(51) Int. Cl.
| | | |
|---|---|---|
| A63F 13/00 | (2014.01) | |
| A63F 13/30 | (2014.01) | |
| G07F 17/32 | (2006.01) | |
| G07F 17/34 | (2006.01) | |

(52) U.S. Cl.
CPC ............ *A63F 13/12* (2013.01); *G07F 17/3267* (2013.01); *G07F 17/3272* (2013.01); *G07F 17/34* (2013.01)

(58) Field of Classification Search
CPC .. G07F 17/32; G07F 17/3267; G07F 17/3262; G07F 17/3276; G07F 17/3272; G07F 17/3239; G07F 17/3225; G07F 17/3274
USPC ................................................ 463/16–20, 42
See application file for complete search history.

(56) References Cited

U.S. PATENT DOCUMENTS

| | | | |
|---|---|---|---|
| 4,624,459 A | 11/1986 | Kaufman | |
| 4,837,728 A | 6/1989 | Barrie et al. | |
| 4,861,041 A | 8/1989 | Jones et al. | |
| 4,948,134 A | 8/1990 | Suttle et al. | |
| 5,116,055 A | 5/1992 | Tracy | |
| 5,249,800 A | 10/1993 | Hilgendorf et al. | |
| 5,275,400 A | 1/1994 | Weingardt | |
| 5,280,909 A | 1/1994 | Tracy | |
| 5,344,144 A | 9/1994 | Canon | |
| 5,377,973 A | 1/1995 | Jones et al. | |
| 5,393,057 A | 2/1995 | Marnell, II | |

(Continued)

FOREIGN PATENT DOCUMENTS

| | | |
|---|---|---|
| CA | 2 334 546 | 8/2001 |
| EP | 0 521 599 | 1/1993 |

(Continued)

*Primary Examiner* — Omikar Deodhar
*Assistant Examiner* — Eric M Thomas
(74) *Attorney, Agent, or Firm* — Neal, Gerber & Eisenberg LLP

(57) ABSTRACT

A gaming system including one or more community game triggering events which function to both: (i) trigger a play of a community game and (ii) determine which players participate in the triggered community game. If a community game triggering event occurs, the gaming system causes a player playing a primary game associated with the occurrence of the community game triggering event to participate in a play of a community game. The gaming system additionally causes zero, one or more other players (i.e., players different from the player playing the primary game associated with the occurrence of the community game triggering event) to also participate in the play of the community game. The gaming system determines which other players participate in the play of the community game based on the specific community game triggering event which occurred.

26 Claims, 8 Drawing Sheets

(56) References Cited

U.S. PATENT DOCUMENTS

| | | |
|---|---|---|
| 5,417,430 A | 5/1995 | Breeding |
| 5,482,289 A | 1/1996 | Weingardt |
| 5,524,888 A | 6/1996 | Heidel |
| 5,554,892 A | 9/1996 | Norimatsu |
| 5,564,700 A | 10/1996 | Celona |
| 5,577,731 A | 11/1996 | Jones |
| 5,577,959 A | 11/1996 | Takemoto |
| 5,580,063 A | 12/1996 | Edwards |
| 5,580,309 A | 12/1996 | Piechowiak et al. |
| 5,611,730 A | 3/1997 | Weiss |
| 5,645,486 A | 7/1997 | Nagao et al. |
| 5,647,592 A | 7/1997 | Gerow |
| 5,655,961 A | 8/1997 | Acres et al. |
| 5,722,890 A | 3/1998 | Libby et al. |
| 5,743,800 A | 4/1998 | Huard et al. |
| 5,766,076 A | 6/1998 | Pease et al. |
| RE35,864 E | 7/1998 | Weingardt |
| 5,779,549 A | 7/1998 | Walker et al. |
| 5,816,918 A | 10/1998 | Kelly et al. |
| 5,820,459 A | 10/1998 | Acres et al. |
| 5,823,874 A | 10/1998 | Adams |
| 5,830,063 A | 11/1998 | Byrne |
| 5,839,956 A | 11/1998 | Takemoto |
| 5,848,932 A | 12/1998 | Adams |
| 5,851,011 A | 12/1998 | Lott |
| 5,851,147 A | 12/1998 | Stupak et al. |
| 5,855,515 A | 1/1999 | Pease et al. |
| 5,885,158 A | 3/1999 | Torango et al. |
| 5,941,773 A | 8/1999 | Harlick |
| 5,944,606 A | 8/1999 | Gerow |
| 5,951,011 A | 9/1999 | Potter et al. |
| 5,975,528 A | 11/1999 | Halaby |
| 6,000,699 A | 12/1999 | Long |
| 6,003,013 A | 12/1999 | Boushy et al. |
| 6,007,427 A | 12/1999 | Wiener et al. |
| 6,012,982 A | 1/2000 | Piechowiak et al. |
| 6,020,884 A | 2/2000 | MacNaughton et al. |
| 6,032,955 A | 3/2000 | Luciano et al. |
| 6,039,648 A | 3/2000 | Guinn et al. |
| 6,047,963 A | 4/2000 | Pierce et al. |
| 6,077,162 A | 6/2000 | Weiss |
| 6,089,976 A | 7/2000 | Schneider et al. |
| 6,089,977 A | 7/2000 | Bennett |
| 6,089,980 A | 7/2000 | Gauselmann |
| 6,102,474 A | 8/2000 | Daley |
| 6,102,798 A | 8/2000 | Bennett |
| 6,102,799 A | 8/2000 | Stupak |
| 6,105,964 A | 8/2000 | Maahs |
| 6,110,043 A | 8/2000 | Olsen |
| 6,139,013 A | 10/2000 | Pierce et al. |
| 6,142,872 A | 11/2000 | Walker et al. |
| 6,146,273 A | 11/2000 | Olsen |
| 6,155,925 A | 12/2000 | Giobbi et al. |
| 6,158,741 A | 12/2000 | Koelling |
| 6,159,097 A | 12/2000 | Gura |
| 6,168,155 B1 | 1/2001 | Kuhlman et al. |
| 6,168,523 B1 | 1/2001 | Piechowiak et al. |
| 6,203,010 B1 | 3/2001 | Jorasch et al. |
| 6,203,429 B1 | 3/2001 | Demar et al. |
| 6,206,374 B1 | 3/2001 | Jones |
| 6,206,782 B1 | 3/2001 | Walker et al. |
| 6,210,275 B1 | 4/2001 | Olsen |
| 6,210,277 B1 | 4/2001 | Stefan |
| 6,217,448 B1 | 4/2001 | Olsen |
| 6,220,593 B1 | 4/2001 | Pierce et al. |
| 6,224,482 B1 | 5/2001 | Bennett |
| 6,224,484 B1 | 5/2001 | Okuda et al. |
| 6,231,445 B1 | 5/2001 | Acres |
| 6,241,608 B1 | 6/2001 | Torango |
| 6,254,483 B1 | 7/2001 | Acres |
| 6,299,533 B1 | 10/2001 | Parra et al. |
| 6,302,791 B1 * | 10/2001 | Frohm et al. ............... 463/21 |
| 6,312,332 B1 | 11/2001 | Walker et al. |
| 6,315,660 B1 | 11/2001 | DeMar et al. |
| 6,319,125 B1 | 11/2001 | Acres |
| 6,319,127 B1 | 11/2001 | Walker et al. |
| 6,331,148 B1 | 12/2001 | Krause et al. |
| 6,336,857 B1 | 1/2002 | McBride |
| 6,336,859 B2 | 1/2002 | Jones et al. |
| 6,336,862 B1 | 1/2002 | Byrne |
| 6,345,824 B1 | 2/2002 | Selitzky |
| 6,347,996 B1 | 2/2002 | Gilmore et al. |
| 6,352,479 B1 | 3/2002 | Sparks, II |
| 6,358,149 B1 | 3/2002 | Schneider et al. |
| 6,361,441 B1 | 3/2002 | Walker et al. |
| 6,364,768 B1 | 4/2002 | Acres et al. |
| 6,375,567 B1 | 4/2002 | Acres |
| 6,375,568 B1 | 4/2002 | Roffman et al. |
| 6,406,369 B1 | 6/2002 | Baerlocher et al. |
| 6,409,602 B1 | 6/2002 | Wiltshire et al. |
| 6,416,408 B2 | 7/2002 | Tracy et al. |
| 6,416,409 B1 | 7/2002 | Jordan |
| 6,422,940 B1 | 7/2002 | Walker et al. |
| 6,431,983 B2 | 8/2002 | Acres |
| 6,435,510 B2 | 8/2002 | Moore |
| 6,435,968 B1 | 8/2002 | Torango |
| 6,439,995 B1 | 8/2002 | Hughs-Baird et al. |
| 6,454,265 B1 | 9/2002 | Elliott et al. |
| 6,482,089 B2 | 11/2002 | DeMar et al. |
| 6,506,117 B2 | 1/2003 | DeMar et al. |
| 6,508,707 B2 | 1/2003 | DeMar et al. |
| 6,508,709 B1 | 1/2003 | Karmarkar |
| 6,517,433 B2 | 2/2003 | Loose et al. |
| 6,520,855 B2 | 2/2003 | DeMar et al. |
| 6,577,733 B1 | 6/2003 | Charrin |
| 6,589,115 B2 | 7/2003 | Walker et al. |
| 6,592,458 B1 | 7/2003 | Ho |
| 6,592,460 B2 | 7/2003 | Torango |
| 6,599,186 B1 | 7/2003 | Walker et al. |
| 6,599,188 B2 | 7/2003 | Hirsch et al. |
| 6,599,193 B2 | 7/2003 | Baerlocher et al. |
| 6,601,771 B2 | 8/2003 | Charrin |
| 6,605,047 B2 | 8/2003 | Zarins et al. |
| 6,609,673 B1 | 8/2003 | Johnson |
| 6,626,758 B1 | 9/2003 | Parham et al. |
| 6,648,753 B1 | 11/2003 | Tracy et al. |
| 6,648,762 B2 | 11/2003 | Walker et al. |
| 6,656,052 B2 | 12/2003 | Abramopoulos et al. |
| 6,663,489 B2 | 12/2003 | Baerlocher |
| 6,676,513 B2 | 1/2004 | Gauselmann |
| 6,685,560 B1 | 2/2004 | Hughes |
| 6,692,354 B2 | 2/2004 | Tracy et al. |
| 6,712,695 B2 | 3/2004 | Mothwurf et al. |
| 6,712,699 B2 | 3/2004 | Walker et al. |
| 6,733,390 B2 | 5/2004 | Walker et al. |
| 6,776,715 B2 | 8/2004 | Price |
| 6,790,141 B2 | 9/2004 | Muir |
| 6,837,793 B2 | 1/2005 | McClintic |
| 6,869,361 B2 | 3/2005 | Sharpless |
| 6,880,824 B2 | 4/2005 | Thiinnes |
| 6,887,154 B1 | 5/2005 | Luciano, Jr. et al. |
| 6,887,159 B2 | 5/2005 | Leen et al. |
| 6,984,174 B2 | 1/2006 | Cannon et al. |
| 7,004,466 B2 | 2/2006 | Gauselmann |
| 7,036,012 B2 | 4/2006 | Charrin |
| 7,056,215 B1 | 6/2006 | Olive |
| 7,070,505 B2 | 7/2006 | Vancura et al. |
| 7,081,050 B2 | 7/2006 | Tarantino |
| 7,169,041 B2 | 1/2007 | Tessmer et al. |
| 7,255,645 B2 | 8/2007 | Steil et al. |
| 7,311,604 B2 | 12/2007 | Kaminkow et al. |
| 7,393,280 B2 | 7/2008 | Cannon |
| 7,427,236 B2 | 9/2008 | Kaminkow et al. |
| 7,500,915 B2 | 3/2009 | Wolf et al. |
| 7,597,621 B2 | 10/2009 | Baerlocher |
| 7,651,392 B2 | 1/2010 | Pennington et al. |
| 7,662,040 B2 | 2/2010 | Englman et al. |
| 7,753,782 B2 | 7/2010 | Cuddy et al. |
| 7,819,745 B2 | 10/2010 | Cuddy et al. |
| 7,828,649 B2 | 11/2010 | Cuddy et al. |
| 7,854,654 B2 | 12/2010 | Baerlocher et al. |
| 7,857,699 B2 | 12/2010 | Baerlocher |
| 7,963,847 B2 | 6/2011 | Baerlocher |
| 8,057,294 B2 | 11/2011 | Pacey et al. |

(56) References Cited

U.S. PATENT DOCUMENTS

| | | |
|---|---|---|
| 8,172,687 B2 | 5/2012 | Gagner et al. |
| 8,262,456 B2 | 9/2012 | Englman et al. |
| 2001/0004609 A1 | 6/2001 | Walker et al. |
| 2002/0132660 A1 | 9/2002 | Taylor |
| 2002/0138594 A1 | 9/2002 | Rowe |
| 2002/0151345 A1 | 10/2002 | Byrne |
| 2002/0155874 A1 | 10/2002 | Byrne |
| 2002/0187823 A1 | 12/2002 | Khal |
| 2003/0014370 A1 | 1/2003 | Charrin |
| 2003/0027618 A1 | 2/2003 | Byrne |
| 2003/0027625 A1 | 2/2003 | Rowe |
| 2003/0030211 A1 | 2/2003 | Brown |
| 2003/0032474 A1 | 2/2003 | Kaminkow |
| 2003/0032479 A1 | 2/2003 | LeMay et al. |
| 2003/0036430 A1 | 2/2003 | Cannon |
| 2003/0045337 A1 | 3/2003 | Byrne |
| 2003/0047874 A1 | 3/2003 | Leen et al. |
| 2003/0060106 A1 | 3/2003 | Haggquist et al. |
| 2003/0060266 A1 | 3/2003 | Baerlocher |
| 2003/0064776 A1 | 4/2003 | Byrne |
| 2003/0064807 A1 | 4/2003 | Walker et al. |
| 2003/0078091 A1 | 4/2003 | Brandstetter et al. |
| 2003/0109306 A1 | 6/2003 | Karmarkar |
| 2003/0114218 A1 | 6/2003 | McClintic |
| 2003/0119576 A1 | 6/2003 | McClintic et al. |
| 2003/0148808 A1 | 8/2003 | Price |
| 2003/0157978 A1 | 8/2003 | Englman |
| 2003/0181231 A1 | 9/2003 | Vancura et al. |
| 2003/0186733 A1 | 10/2003 | Wolf et al. |
| 2003/0211884 A1 | 11/2003 | Gauselmann |
| 2003/0216166 A1 | 11/2003 | Baerlocher et al. |
| 2003/0222402 A1 | 12/2003 | Olive |
| 2003/0224852 A1 | 12/2003 | Walker |
| 2003/0228899 A1 | 12/2003 | Evans |
| 2003/0236116 A1 | 12/2003 | Marks et al. |
| 2004/0009808 A1 | 1/2004 | Gauselmann |
| 2004/0009811 A1 | 1/2004 | Torango |
| 2004/0023716 A1 | 2/2004 | Gauselmann |
| 2004/0038741 A1 | 2/2004 | Gauselmann |
| 2004/0048644 A1 | 3/2004 | Gerrard et al. |
| 2004/0063484 A1 | 4/2004 | Dreaper et al. |
| 2004/0087368 A1 | 5/2004 | Gauselmann |
| 2004/0092304 A1 | 5/2004 | Geore |
| 2004/0106448 A1 | 6/2004 | Gauselmann |
| 2004/0127284 A1 | 7/2004 | Walker |
| 2004/0132524 A1 | 7/2004 | Ramstad et al. |
| 2004/0142750 A1 | 7/2004 | Glisson et al. |
| 2004/0152511 A1 | 8/2004 | Nicely et al. |
| 2004/0162144 A1 | 8/2004 | Loose et al. |
| 2004/0204226 A1 | 10/2004 | Foster et al. |
| 2004/0204235 A1* | 10/2004 | Walker .................. G07F 17/32 463/29 |
| 2004/0235552 A1 | 11/2004 | Gauselmann |
| 2004/0242297 A1 | 12/2004 | Walker et al. |
| 2004/0242303 A1 | 12/2004 | Walker et al. |
| 2004/0242320 A1 | 12/2004 | Jackson |
| 2004/0248651 A1 | 12/2004 | Gagner et al. |
| 2004/0259633 A1 | 12/2004 | Gentles et al. |
| 2005/0003880 A1 | 1/2005 | Englman |
| 2005/0003886 A1 | 1/2005 | Englman et al. |
| 2005/0014554 A1 | 1/2005 | Walker |
| 2005/0015687 A1 | 1/2005 | Lai et al. |
| 2005/0017451 A1 | 1/2005 | Ollington |
| 2005/0026674 A1 | 2/2005 | Wolf et al. |
| 2005/0037837 A1 | 2/2005 | Rowe |
| 2005/0059467 A1 | 3/2005 | Saffari et al. |
| 2005/0059472 A1 | 3/2005 | Joshi et al. |
| 2005/0064930 A1 | 3/2005 | Jubinville et al. |
| 2005/0075889 A1 | 4/2005 | Gomes et al. |
| 2005/0096130 A1 | 5/2005 | Mullins |
| 2005/0101384 A1 | 5/2005 | Parham |
| 2005/0137010 A1 | 6/2005 | Enzminger et al. |
| 2005/0148382 A1 | 7/2005 | Fox |
| 2005/0159207 A1 | 7/2005 | Thomas |
| 2005/0170883 A1 | 8/2005 | Muskin |
| 2005/0187008 A1 | 8/2005 | Nakajima |
| 2005/0187014 A1 | 8/2005 | Saffari et al. |
| 2005/0192073 A1 | 9/2005 | Nakajima |
| 2005/0192088 A1 | 9/2005 | Hartman et al. |
| 2005/0215313 A1 | 9/2005 | O'Halloran |
| 2005/0221884 A1 | 10/2005 | Seelig et al. |
| 2005/0282603 A1 | 12/2005 | Parrott et al. |
| 2005/0282628 A1 | 12/2005 | Beatty |
| 2006/0003829 A1 | 1/2006 | Thomas |
| 2006/0009280 A1 | 1/2006 | Joshi et al. |
| 2006/0009283 A1 | 1/2006 | Englman et al. |
| 2006/0019737 A1 | 1/2006 | Yang |
| 2006/0019744 A1 | 1/2006 | Roemer |
| 2006/0025195 A1 | 2/2006 | Pennington et al. |
| 2006/0025210 A1 | 2/2006 | Johnson |
| 2006/0030403 A1 | 2/2006 | Lafky et al. |
| 2006/0035706 A1 | 2/2006 | Thomas et al. |
| 2006/0046823 A1 | 3/2006 | Kaminkow et al. |
| 2006/0052159 A1 | 3/2006 | Cahill et al. |
| 2006/0068909 A1 | 3/2006 | Pryzby et al. |
| 2006/0073877 A1 | 4/2006 | Rodgers et al. |
| 2006/0073889 A1 | 4/2006 | Edidin et al. |
| 2006/0116201 A1 | 6/2006 | Gauselmann |
| 2006/0121971 A1 | 6/2006 | Slomiany |
| 2006/0135243 A1 | 6/2006 | Englman et al. |
| 2006/0142079 A1 | 6/2006 | Ikehara et al. |
| 2006/0142086 A1 | 6/2006 | Blackburn et al. |
| 2006/0154714 A1 | 7/2006 | Montross et al. |
| 2006/0154718 A1 | 7/2006 | Willyard et al. |
| 2006/0178203 A1 | 8/2006 | Hughes et al. |
| 2006/0183535 A1 | 8/2006 | Marks et al. |
| 2006/0183537 A1 | 8/2006 | Dickerson |
| 2006/0183538 A1 | 8/2006 | Michaelson et al. |
| 2006/0205497 A1 | 9/2006 | Wells et al. |
| 2006/0281527 A1 | 12/2006 | Dunaevsky et al. |
| 2006/0287043 A1 | 12/2006 | Englman et al. |
| 2006/0287077 A1 | 12/2006 | Grav et al. |
| 2007/0026941 A1 | 2/2007 | Block et al. |
| 2007/0054732 A1 | 3/2007 | Baerlocher |
| 2007/0054733 A1 | 3/2007 | Baerlocher |
| 2007/0060244 A1 | 3/2007 | Yaldoo et al. |
| 2007/0060271 A1 | 3/2007 | Cregan et al. |
| 2007/0060314 A1 | 3/2007 | Baerlocher et al. |
| 2007/0060317 A1 | 3/2007 | Martin |
| 2007/0060319 A1 | 3/2007 | Block et al. |
| 2007/0060330 A1* | 3/2007 | Martin ................ G07F 17/3276 463/29 |
| 2007/0060365 A1 | 3/2007 | Tien et al. |
| 2007/0060369 A1* | 3/2007 | Martin ................ G07F 17/3276 463/42 |
| 2007/0105619 A1 | 5/2007 | Kniesteadt et al. |
| 2007/0167217 A1 | 7/2007 | MacVittie et al. |
| 2007/0259711 A1 | 11/2007 | Thomas |
| 2008/0070697 A1 | 3/2008 | Robinson et al. |
| 2008/0102916 A1 | 5/2008 | Kovacs et al. |
| 2008/0108401 A1 | 5/2008 | Baerlocher et al. |
| 2008/0108429 A1 | 5/2008 | Davis et al. |
| 2008/0113765 A1 | 5/2008 | DeWaal |
| 2008/0113768 A1 | 5/2008 | Baerlocher |
| 2008/0113771 A1 | 5/2008 | Baerlocher et al. |
| 2008/0311980 A1 | 12/2008 | Cannon |
| 2009/0011822 A1* | 1/2009 | Englman ............ G07F 17/3265 463/25 |
| 2009/0042644 A1 | 2/2009 | Zielinski |
| 2009/0088253 A1 | 4/2009 | Oberberger et al. |
| 2009/0111560 A1 | 4/2009 | Davis et al. |
| 2009/0117970 A1 | 5/2009 | DeWaal et al. |
| 2009/0117979 A1 | 5/2009 | Decasa, Jr. et al. |
| 2009/0124320 A1 | 5/2009 | DeWaal et al. |
| 2009/0124327 A1 | 5/2009 | Caputo et al. |
| 2009/0124351 A1 | 5/2009 | DeWaal et al. |
| 2009/0124362 A1 | 5/2009 | Cuddy et al. |
| 2009/0124363 A1 | 5/2009 | Baerlocher et al. |
| 2009/0124385 A1 | 5/2009 | Cuddy et al. |
| 2009/0253492 A1 | 10/2009 | Caputo et al. |
| 2010/0016065 A1 | 1/2010 | Nicely et al. |
| 2010/0029363 A1 | 2/2010 | Hoffman et al. |
| 2010/0041468 A1 | 2/2010 | Baerlocher et al. |
| 2010/0048282 A1 | 2/2010 | Nicely et al. |

(56) References Cited

U.S. PATENT DOCUMENTS

| | | |
|---|---|---|
| 2010/0056247 A1 | 3/2010 | Nicely et al. |
| 2010/0087247 A1 | 4/2010 | Joshi et al. |
| 2010/0120494 A1 | 5/2010 | DeWaal et al. |
| 2010/0120503 A1 | 5/2010 | Hoffman et al. |
| 2010/0120521 A1 | 5/2010 | Caputo et al. |
| 2010/0210348 A1 | 8/2010 | Peterson |
| 2011/0111827 A1 | 5/2011 | Nicely et al. |
| 2011/0230251 A1 | 9/2011 | Nicely et al. |

FOREIGN PATENT DOCUMENTS

| | | |
|---|---|---|
| GB | 2 153 572 | 8/1985 |
| GB | 2 181 589 | 4/1987 |
| GB | 2 242 300 | 9/1991 |
| GB | 2 313 792 | 12/1997 |
| GB | 2 333 880 | 8/1999 |
| GB | 2 457 391 | 8/2009 |
| WO | WO 99/03078 | 1/1999 |
| WO | WO 99/15246 | 4/1999 |
| WO | WO 99/19037 | 4/1999 |
| WO | WO 01/33478 | 5/2001 |
| WO | WO 02/30534 | 4/2002 |
| WO | WO 03/026754 | 4/2003 |
| WO | WO 03/083789 | 10/2003 |
| WO | WO 2005/113088 | 12/2005 |
| WO | WO 2006/014770 | 2/2006 |
| WO | WO 2006/014883 | 2/2006 |
| WO | WO 2006/014990 | 2/2006 |
| WO | WO 2006/039349 | 4/2006 |
| WO | WO 2007/117502 | 10/2007 |
| WO | WO 2008/022323 | 2/2008 |
| WO | WO 2008/051796 | 5/2008 |

* cited by examiner

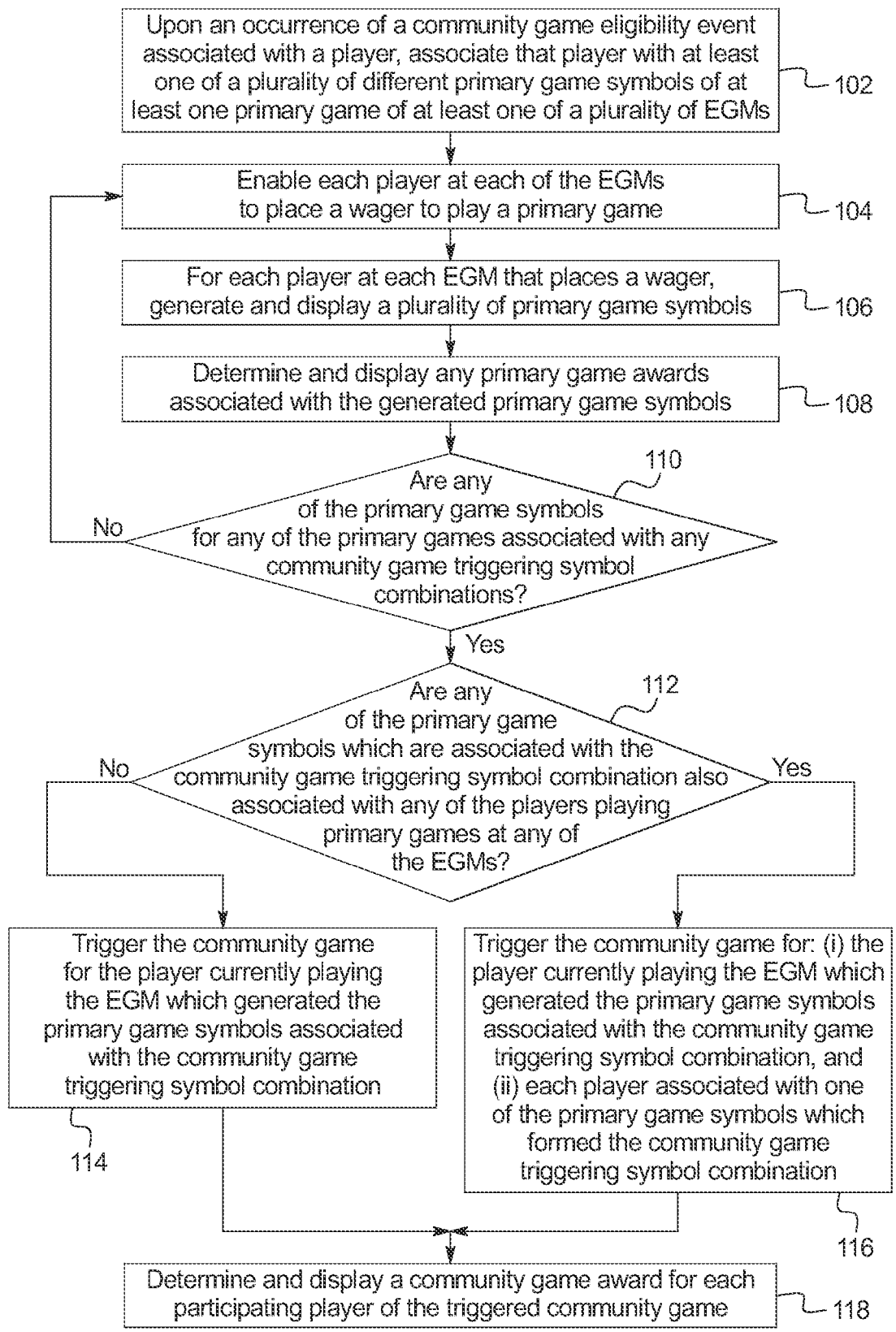

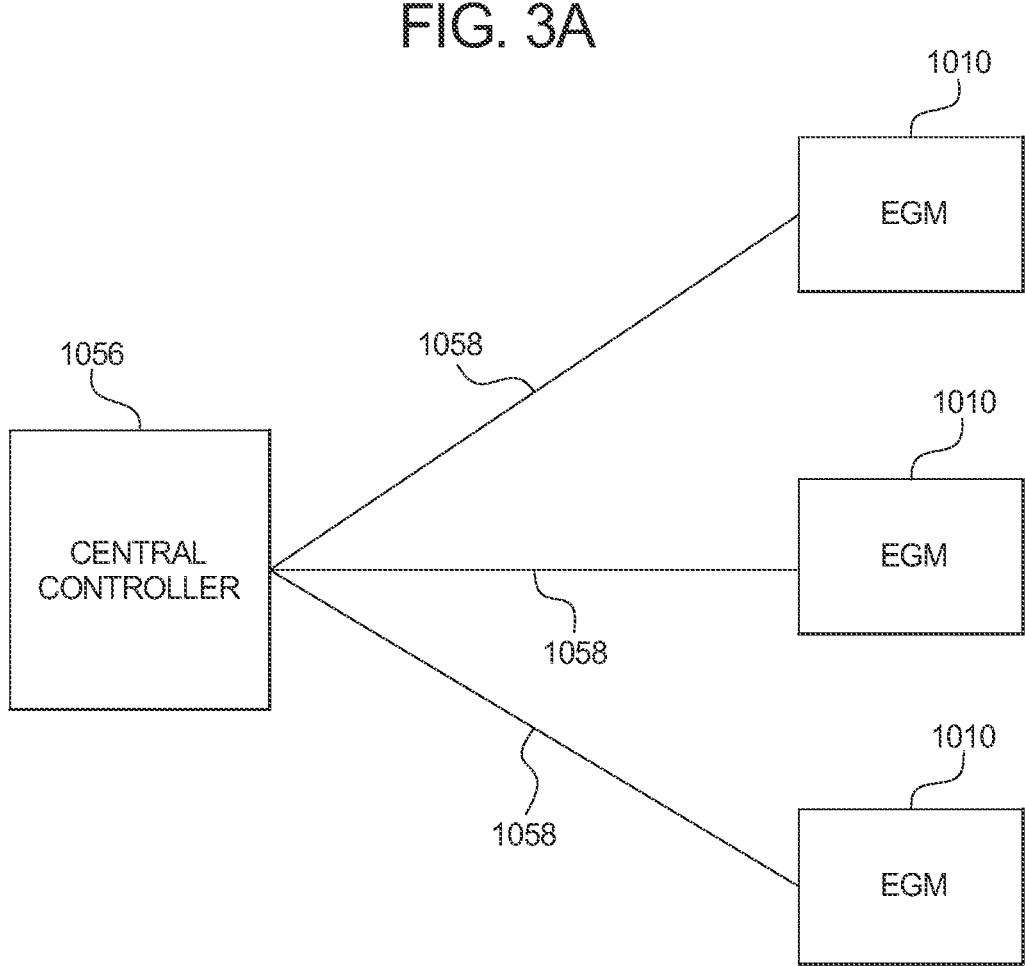

GAMING SYSTEM AND METHOD FOR PROVIDING A MULTIPLE PLAYER GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

In recent years, gaming has become a more social leisure activity. Gaming establishments often strive for ways to enable players to work together in gaming. Working together creates camaraderie among the players and provides an enhanced gaming experience. Certain secondary or bonus games include a group gaming aspect wherein a plurality of players participate in a group bonus game for one or more bonus awards.

Accordingly, there is a continuing need to provide new bonus games which include a group gaming aspect, wherein a plurality of players playing at linked gaming machines participate in a group bonus game for one or more bonus awards.

SUMMARY

The present disclosure relates generally to gaming systems and methods for providing a multiple player or community game.

In various embodiment, the gaming system disclosed herein includes one or more community game triggering events which function to both: (i) trigger a play of a community game, and (ii) determine which players participate in the triggered community game. In certain embodiments, if a community game triggering event occurs, the gaming system causes a player playing a primary game associated with the occurrence of the community game triggering event to participate in a play of a community game. In these embodiments, the gaming system additionally causes zero, one or more other players (i.e., players different from the player playing the primary game associated with the occurrence of the community game triggering event) to also participate in the play of the community game. In such embodiments, the gaming system determines which other players participate in the play of the community game based on the specific community game triggering event which occurred. Such a configuration provides an increased level of excitement and enjoyment for certain players by enabling such players to participate in one or more community games based on community game triggering events which occur remote or otherwise separate from any plays of any primary games played by such players.

More specifically, in various embodiments, the gaming system enables a plurality of players to each individually play a plurality of primary games. For each primary game played, the gaming system generates one or more of a plurality of primary game symbols and provides the player of that primary game with any primary game awards based on the generated primary game symbol(s). Additionally, in conjunction with the plays of the primary games, the gaming system associates one or more of the plurality of primary game symbols with each eligible player (or each eligible gaming machine). For example, if five eligible players are currently playing primary games, for each of the five eligible players, the gaming system associates at least one of the primary game symbols available to be generated in association with at least one of the plays of at least one of the primary games with that eligible player.

In these embodiments, if the gaming system generates a community game triggering symbol combination, the gaming system determines which eligible players (or which eligible gaming machines), if any, are associated with the generated primary game symbols of the community game triggering symbol combination. The gaming system then triggers a play of a community game wherein any eligible players (or any eligible gaming machines) associated with the primary game symbols of the community game triggering symbol combination participate in the play of the triggered community game. That is, in addition to enabling the triggering player (i.e., the player of the primary game which generated the community game triggering symbol combination) to participate in the triggered community game, the gaming system enables zero, one or more non-triggering players (i.e., the player(s) associated with the individual primary game symbols of the generated community game triggering symbol combination) to also participate in the triggered community game. Continuing with the above-example, in association with a first player's play of a primary game, the gaming system generates a community game triggering symbol combination including: (i) a first primary game symbol associated with a second player (who is not playing the primary game associated with the generation of the community game triggering symbol combination) and (ii) a second primary game symbol associated with a third, different player (who is also not playing the primary game associated with the generation of the community game triggering symbol combination). In this example, the gaming system triggers a play of the community game wherein the first player playing the primary game associated with the generation of the community game triggering symbol combination participates in the community game as the triggering player, the second player participates in the community game as a non-triggering player and the third player also participates in the community game as a non-triggering player. Such a configuration provides that different random combinations of players will participate in the community game, wherein which players participate is based on the random combination of primary game symbols generated in one of the participating player's plays of a primary game. Accordingly, certain of the embodiments disclosed herein provide an increase level of excitement and enjoyment for certain players because the gaming system enables such players to participate in a community game based on the events occurring in association with one or more primary games not currently being played by such players.

Additional features and advantages are described in, and will be apparent from, the following Detailed Description and the figures.

BRIEF DESCRIPTION OF THE FIGURES

FIG. 1 is a flow chart an example process for operating a gaming system providing one embodiment of a community game as disclosed herein.

FIG. 3A is a schematic block diagram of one embodiment of a network configuration of the gaming system disclosed herein.

DETAILED DESCRIPTION

Community Game

Figure 2A:
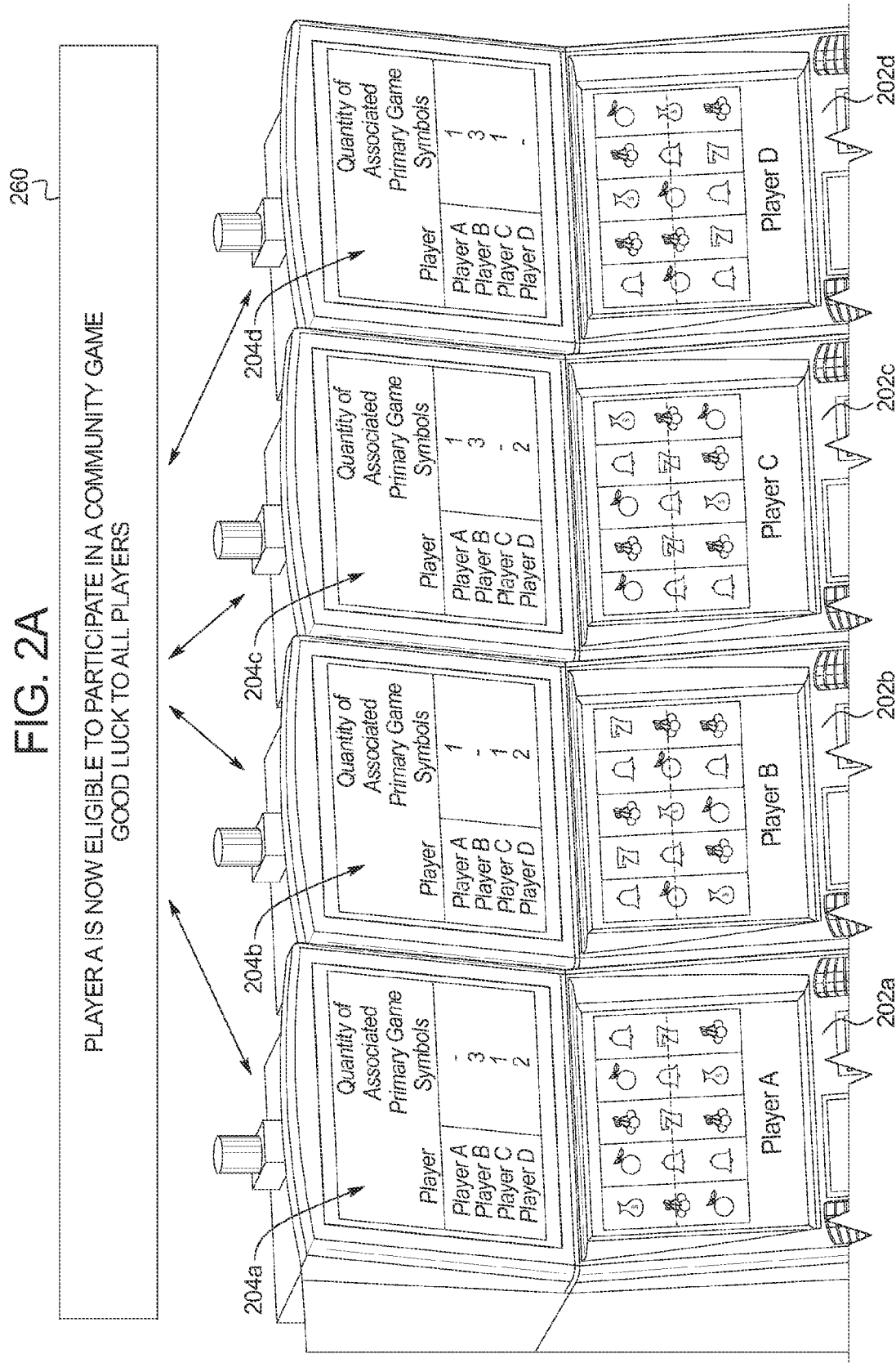
FIGS. 2A, 2B and 2C are front views of one embodiment of the gaming system disclosed herein illustrating a triggering of a community game.

In various embodiment, the gaming system disclosed herein includes one or more community game triggering events which function to both: (i) trigger a play of a community game, and (ii) determine which players participate in the triggered community game. In certain embodiments, if a community game triggering event occurs, the gaming system causes a player playing a primary game associated with the occurrence of the community game triggering event to participate in a play of a community game. In these embodiments, the gaming system additionally causes zero, one or more other players (i.e., players different from the player playing the primary game associated with the occurrence of the community game triggering event) to also participate in the play of the community game. In such embodiments, the gaming system determines which other players participate in the play of the community game based on the specific community game triggering event which occurred. Such a configuration provides an increased level of excitement and enjoyment for certain players by enabling such players to participate in one or more community games based on community game triggering events which occur remote or otherwise separate from any plays of any primary games played by such players.

While certain of the embodiments described below are directed to triggering a community game as a secondary or bonus game, it should be appreciated that the present disclosure may additionally or alternatively be employed in association with determining which player's participate in one or more plays of a primary or base wagering community game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, upon an occurrence of a community game eligibility event associated with a player, as indicated in block 102 of FIG. 1, the gaming system associates that player with at least one of a plurality of different primary game symbols of at least one primary game of at least one of a plurality of EGMs. In another embodiment wherein the identity of a player playing at least one primary game of an EGM is unknown or otherwise anonymous, upon an occurrence of the community game eligibility event associated with such an unknown player, the gaming system associates the EGM currently played by that unknown player with at least one of a plurality of different primary game symbols of at least one primary game of at least one of the plurality of EGMs.

In one embodiment, a community game eligibility event occurs when a player submits (such as inserting) a player tracking card or inputs other identification into the gaming device. In another embodiment, a community game eligibility event occurs when a player places a wager on a play of a primary game. In another embodiment, a community game eligibility event occurs when a player begins play at a dedicated account based gaming machine that is configured to play with a specific player. In another embodiment, a community game eligibility event occurs when the gaming system determines an active status associated with the player. In this embodiment, active status includes the player actively playing one or more plays of one or more games during a qualification period. In one such embodiment, actively playing during a qualification period includes the player playing one or more plays of the primary game (i.e., placing wagers on plays of the primary game) at least at a predefined minimum rate during a predefined time period. In another embodiment, a community game eligibility event occurs based on a displayed event associated with a play of a game. In another embodiment, a community game eligibility event occurs based on an event independent of any displayed event associated with any play of any game.

In one embodiment, in associating a player with a primary game symbol, the gaming system modifies or otherwise changes how that symbol is displayed during the plays of the primary games by one or more EGMs. In one such embodiment, if a community game eligibility event has not previously occurred in association with the player, the gaming system enables the player to configure or select one or more characteristics or icons of the primary game symbol associated with that player. In one such embodiment, in configuring a primary game symbol, the gaming system enables the player to select one or more of a gender, clothing, body characteristics or features, facial characteristics or features, and/or celebration sounds or catch-phrases of an avatar displayed as the primary game symbol associated with that player. In another such embodiment, in configuring a primary game symbol, the gaming system enables the player to select one or more photos, such as one or more photos taken from a social networking website, displayed as the primary game symbol associated with that player. On the other hand, if a community game eligibility event has previously occurred in association with the player, the gaming system accesses a previously configured primary game symbol associated with the player. In one such embodiment, if the player has obtained any virtual goods (from purchasing such virtual goods and/or winnings such virtual goods in association with one or more plays of one or more primary games and/or bonus games), the gaming system enables the player to modify their existing configured primary game symbol with such virtual goods.

In one embodiment, upon an occurrence of a community game eligibility event associated with a player, the gaming system associates that player with one primary game symbol of the primary game of one EGM. In another embodiment, upon an occurrence of a community game eligibility event associated with a player, the gaming system associates that player with one primary game symbol of the primary games of a plurality of EGMs. In another embodiment, upon an occurrence of a community game eligibility event associated with a player, the gaming system associates that player with a plurality of primary game symbols of the primary game of one EGM. In another embodiment; upon an occurrence of a community game eligibility event associated with a player, the gaming system associates that player with a plurality of primary game symbols of the primary games of a plurality of EGMs.

In one embodiment, upon an occurrence of a community game eligibility event associated with a player, the gaming system associates that player with one or more primary game symbols of one or more primary games of one or more EGMs excluding that player's currently played EGM. In this embodiment, if a community game eligibility event has occurred for each of N players in a group of EGMs, each player's primary game includes [N−1] primary game symbols associated with the other players in the group of EGMs, wherein each of such primary game symbols corresponds to one of the [N−1] other players. In another embodiment, an EGM includes less than N−1 (where N is the number of players) different player-associated primary game symbols. For example, in a game with 4 players, each EGM includes 2 different player-associated primary game symbols such that: (i) EGM 1 has primary game symbols associated with players 2 and 3; (ii) EGM 2 has primary game symbols associated with players 3 and 4 ; (iii) EGM 3 has primary game symbols associated with players 4 and 1; and (iv) EGM 4 has primary game symbols associated with players 1 and 2. Accordingly, in these embodiments, as the primary game of a player's EGM does not include any primary game symbols associated with that player, each primary game of each EGM is associated with a different set of symbols (i.e., a player's avatar primary game symbol is not included in the set of available symbols for the player's play of a primary game).

For example, as seen in FIG. 2A, upon a first player (i.e., Player A) placing a wager to play a primary game of a first EGM 202a (i.e., the occurrence of a community game eligibility event associated with the first player), the gaming system causes at least one primary game symbol of the primary games of a second player (i.e., Player B) currently playing a second EGM 202b; a third player (i.e., Player C) currently playing a third EGM 202c and a fourth player (i.e., Player D) currently playing a fourth EGM 202d to each be associated with the first player. In this example, the gaming system provides appropriate messages such as "PLAYER A IS NOW ELIGIBLE TO PARTICIPATE IN A COMMUNITY GAME" and "GOOD LUCK TO ALL PLAYERS" to one or more players visually, or through suitable audio or audiovisual displays, such as community display device 260.

As further seen in FIG. 2A, in addition to associating one or more primary game symbols of the primary games of the second player, the third player and the fourth player with the first player, since the second player, the third player and the fourth player were each previously associated with primary game symbols: (i) for the primary game of the first EGM 202a currently played by the first player, one or more of the primary game symbols are associated with the second player, one or more of the primary game symbols are associated with the third player, and one or more of the primary game symbols are associated with the fourth player; (ii) for the primary game of the second EGM 202b currently played by the second player, in addition to the primary game symbols associated with the first player, one or more of the primary game symbols are associated with the third player and one or more of the primary game symbols are associated with the fourth player; (iii) for the primary game of the third EGM 202c currently played by the third player, in addition to the primary game symbols associated with the first player, one or more of the primary game symbols are associated with the second player and one or more of the primary game symbols are associated with the fourth player; and (iv) for the primary game of the fourth EGM 202*d* currently played by the fourth player, in addition to the primary game symbols associated with the first player, one or more of the primary game symbols are associated with the second player and one or more of the primary game symbols are associated with the third player. As seen in the individual charts 204*a* to 204*d* displayed by the individual EGMs of FIG. 2A, for each of the EGMs, the gaming system displays to the player of that EGM which other players are associated with one or more primary game symbols of the primary game of that EGM.

In one embodiment, upon an occurrence of a community game eligibility event associated with a player, the gaming system associates that player with one or more primary game symbols of one or more primary games of one or more EGMs including that player's currently played EGM. In one such embodiment, upon an occurrence of a community game eligibility event associated with a player, the gaming system associates that player with a plurality of primary game symbols of the primary game of that player's currently played EGM and further associates that player with one primary game symbol of one or more of the primary games of one or more other EGMs. In one such embodiment, the gaming system associates a player with more primary game symbols of the primary game of that player's currently played EGM than the gaming system associates other players with the primary game symbols of that player's currently played EGM. In this embodiment, each primary game of each EGM is associated with a different set of symbols.

Following the association of the player with at least one of the primary game symbols of at least one of the primary games of at least one of the EGMs, the gaming system enables each player at each of the EGMs to place a wager to play a primary game as indicated in block 104 of FIG. 1.

For each player at each of the EGMs that places a wager, the gaming system generates and displays a plurality of primary game symbols as indicated in block 106. The gaming system then determines and displays any primary game awards associated with the generated primary game symbols as indicated in block 108.

In different embodiments, one or more of the primary games (which generated one or more primary game symbols) played by one or more of the EGMs include, but are not limited to: a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, or a play of any other suitable type of game.

In addition to determining any primary game awards associated with the generated primary game symbols for each wagered on primary game, the gaming system determines if any of the primary game symbols for any of the primary games are associated with any community game triggering symbol combinations as indicated in diamond 110.

If none of the primary game symbols for the play of the primary game of an EGM are associated with any community game triggering symbol combinations, the gaming system returns to block 104 and proceeds as described above with enables the player at that EGM to place a wager to play a primary game.

On the other hand, if the primary game symbols for the play of the primary game of an EGM are associated with a community game triggering symbol combination, the gaming system determines if any of the primary game symbols which are associated with the community game triggering symbol combination are also associated with any of the players playing primary games at any of the EGMs as indicated in diamond 112. Put differently, the gaming system determines which eligible players, if any, are associated with the generated primary game symbols of the generated community game triggering symbol combination.

If the gaming system determines that the primary game symbols of the community game triggering symbol combination are not associated with any players, as indicated in block 114, the gaming system triggers the community game for the player currently playing the EGM which generated the primary game symbols associated with the community game triggering symbol combination. That is, if the gaming system determines that no eligible players are associated with the generated primary game symbols of the generated community game triggering symbol combination, the gaming system triggers the community game for the player of the community game triggering EGM.

If the gaming system determines that the primary game symbols of the community game triggering symbol combination are associated with at least one other player, as indicated in block 116, the gaming system triggers the community game for: (i) the player currently playing the EGM which generated the primary game symbols associated with the community game triggering symbol combination, and (ii) each player associated with one of the primary game symbols which formed the community game triggering symbol combination. That is, in addition to enabling the player of the community game triggering EGM to participate in the community game, the gaming system enables one or more players of community game non-triggering EGMS (i.e., the player associated with the individual primary game symbols of the generated community game triggering symbol combination) to also participate in the triggered community game.

Figure 2B:
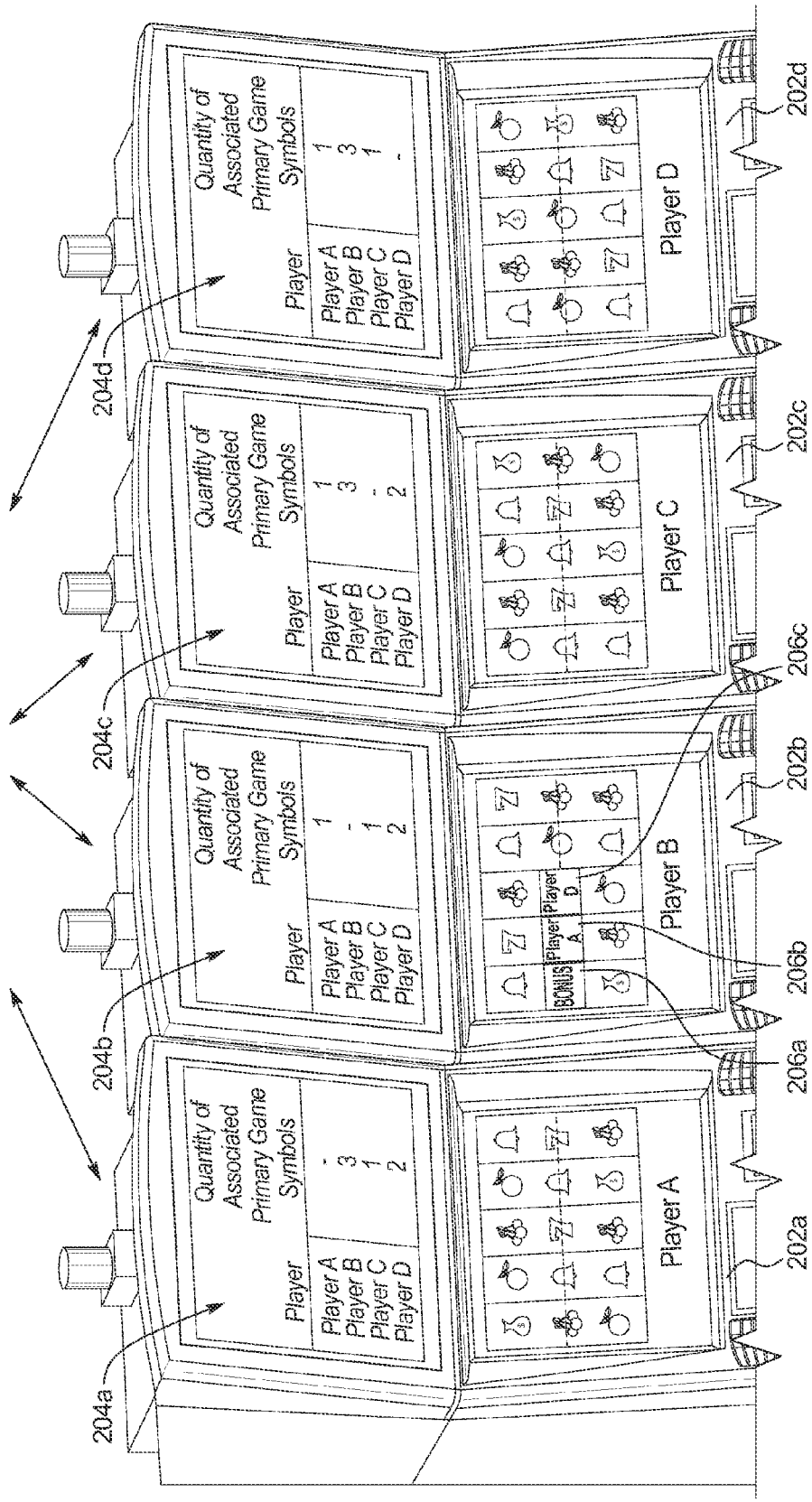

For example, as seen in FIG. 2B, for a play of a primary game by the second player at the second EGM 202*b*, the gaming system generated a community game triggering symbol combination which included a community game triggering primary game symbol 206*a* not associated with any players, a community game triggering primary game symbol 206*b* associated with the first player (i.e., Player A) and a community game triggering primary game symbol 206*c* associated with the fourth player (i.e., Player D). Accordingly, the gaming system triggers the community game for: (i) the second player at the second EGM 202*b* (i.e., the player currently playing the EGM which generated the primary game symbols associated with the community game triggering symbol combination; (ii) the first player at the first EGM 202a (i.e., a player associated with one of the primary game symbols which formed the community game triggering symbol combination); and (iii) the fourth player at the fourth EGM 202d (i.e., a player associated with one of the primary game symbols which formed the community game triggering symbol combination). In this example, the gaming system provides appropriate messages such as "PLAYER B TRIGGERED THE COMMUNITY GAME AND WILL PARTICIPATE IN THE TRIGGERED COMMUNITY GAME" and "SINCE PLAYER A AND PLAYER D EACH WERE ASSOCIATED WITH SYMBOLS OF THE COMMUNITY GAME TRIGGERING SYMBOL COMBINATION, PLAYER A AND PLAYER D ALSO WILL PARTICIPATE IN THE TRIGGERED COMMUNITY GAME" to one or more players visually, or through suitable audio or audiovisual displays, such as community display device 260.

As further seen in FIG. 2B, because the third EGM 202c currently being played by the third player did not generate the community game triggering symbol combination and further because the generated community game triggering symbol combination did not include any primary game symbols associated with the third player, the gaming system determined that the third player will not participate in the play of the triggered community game.

Following the triggering of the community game (for the player of the community game triggering EGM and zero, one or more players at community game non-triggering EGMs), the gaming system determines and displays a community game award for each participating player of the triggered community game as indicated in block 118.

Figure 2C:
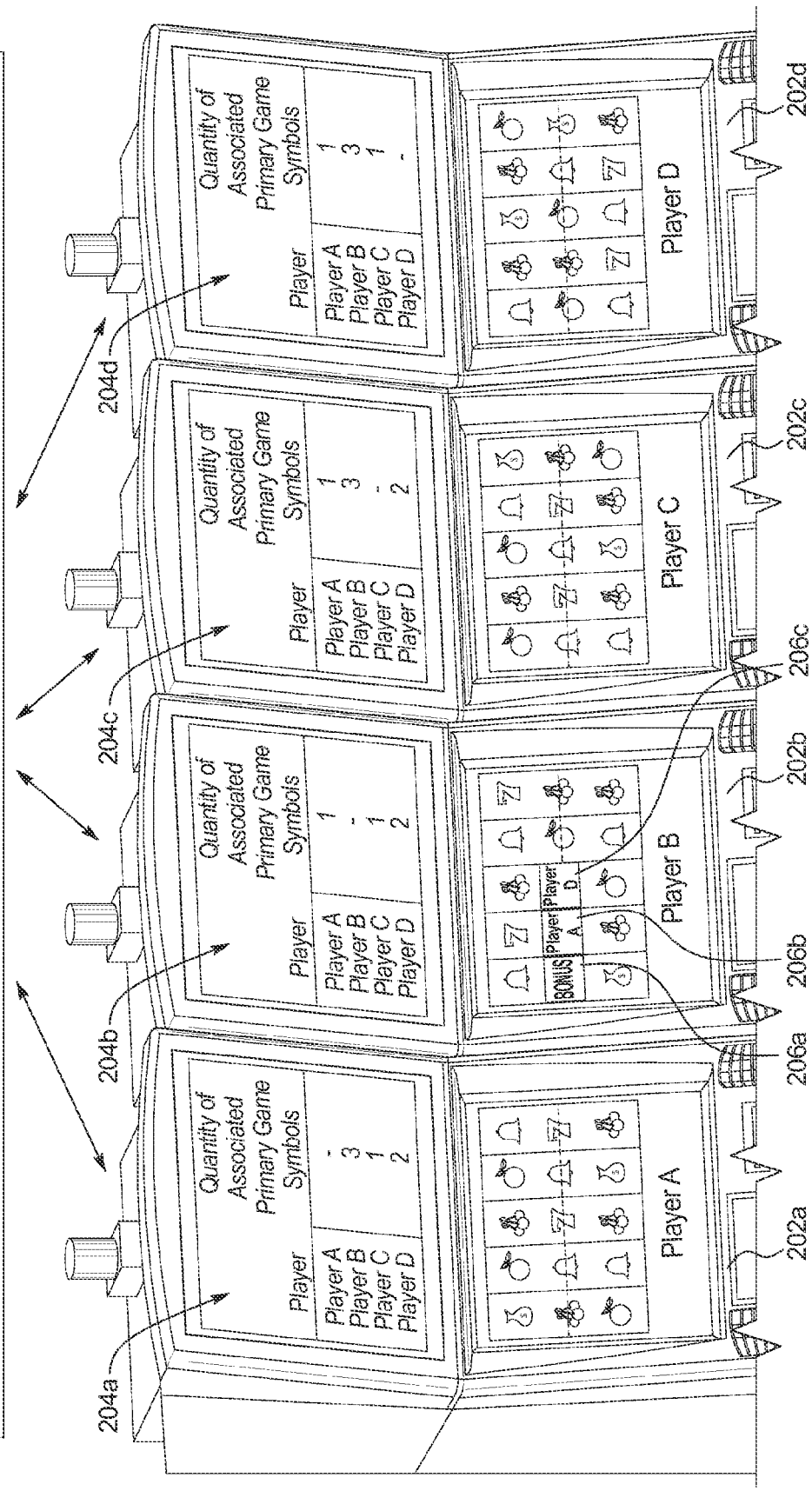

For example, as seen in FIG. 2C, for a play of a triggered community game, the gaming system determined a community game award of one-thousand credits and provided each of the second player at the second EGM 202b, the first player at the first EGM 202a and the fourth player at the fourth EGM 202d with one-thousand credits. In this example, the gaming system provides appropriate messages such as "EACH PARTICIPATING PLAYER IN THE COMMUNITY GAME WINS 1000 CREDITS" and "NICE WIN" to one or more players visually, or through suitable audio or audiovisual displays, such as community display device 260.

In one embodiment, the triggered community game is a cooperative community game wherein the participating players work in conjunction with one another, such as by playing together as a team or group, to win one or more community game awards. In one such embodiment, any community game award won by the group is shared, either equally or based on any suitable criteria, amongst the different players of the group. In another embodiment, the triggered community game is a competitive community game wherein the participating players compete against one another for one or more community game awards.

In different embodiments, the play of the community game includes, but is not limited to: a play of any suitable slot community game, a play of any suitable free spins or free activations community game, a play of any suitable wheel community game, a play of any suitable card community game, a play of any suitable offer and acceptance community game, a play of any suitable award ladder community game, a play of any suitable puzzle-type community game, a play of any suitable persistence community game, a play of any suitable selection community game, a play of any suitable cascading symbols community game, a play of any suitable ways to win community game, a play of any suitable scatter pay community game, a play of any suitable coin-pusher community game, a play of any suitable elimination community game, a play of any suitable stacked wilds community game, a play of any suitable trail community game, a play of any suitable bingo community game, a play of any suitable video scratch-off community game, a play of any suitable pick-until-complete community game, a play of any suitable shooting simulation community game, a play of any suitable racing community game, a play of any suitable promotional community game, a play of any suitable high-low community game, a play of any suitable lottery community game, a play of any suitable number selection community game, a play of any suitable dice community game, a play of any suitable skill community game, a play of any suitable auction community game, a play of any suitable reverse-auction community game, a play of any suitable group game or a play of any other suitable type of community game.

In different embodiments, the primary game awards and/or community game awards include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on the internet.

In one embodiment, the gaming system causes at least one display device of the player's EGM to display the community game. In another embodiment, in addition or in alternative to each EGM displaying the community game, the gaming system causes one or more community or overhead display devices to display part or all of the community game to one or more other players or bystanders either at a gaming establishment or viewing over a network, such as the internet. In another embodiment, in addition or in alternative to each EGM displaying the community game, the gaming system causes one or more internet sites to each display the community game such that a player is enabled to log on from a personal web browser. In another such embodiment, the gaming system enables the player to play one or more primary games on one device while viewing the community game from another device. For example, the gaming system enables the player to play one or more primary games on a mobile phone while viewing the status of the community game on a desktop or laptop computer.

In one embodiment, as described above, in associating a player with a primary game symbol, the gaming system modifies or otherwise changes how that symbol is displayed during the plays of the primary games by one or more EGMs. For example, if a primary game symbol is associated with a player and the player selected a picture of that player's pet, the gaming system displays a picture of that player's pet as the primary game symbol. In another embodiment, the gaming system modifies or otherwise changes how the primary game symbol is displayed by associating one or more overlay symbols with the primary game symbol associated with the player. In one such embodiment, the gaming system employs a multiple level or multiple layered display device which includes an exterior display device arranged outside of and relative to an interior display device such that a common line of sight passes through a portion of the exterior display device to a portion of the interior display device. In this embodiment, at least one level or layer of this display device displays the primary game symbol and at least one level or layer of the display device displays indicia associated with the player which indicate that the primary game symbol is associated with a particular player. In another such embodiment, the gaming system utilizes one or more transmissive display devices including a video display device positioned in a player's line of sight and in front of a mechanical display device, such as a mechanical reel. In this embodiment, the video display device is configured to selectively display transparent, translucent and opaque images to display indicia associated with the player and indicate that the primary game symbol is associated with a particular player.

In one embodiment, each time a community game eligibility event occurs in association with a player, the gaming system associates one or more primary game symbols with that player. In another embodiment, if a player is already associated with a primary game symbol and another community game eligibility event occurs in association with the player, no additional primary game symbols are associated with the player.

In one embodiment, if a community game eligibility event occurs in association with a player, the gaming system associates a specific symbol of a specific symbol display position with the player (i.e., the gaming system associates an instance of a specific symbol with the player). For example, if a community game eligibility event occurs in associated with a player playing a reel game, the gaming system associates the symbol located at the second symbol display position of the second reel with the player. In another embodiment, if a community game eligibility event occurs in association with a player, the gaming system associates a plurality of symbol of a plurality of specific symbol display positions with the player. In another embodiment, if a community game eligibility event occurs in association with a player, the gaming system associates a symbol with the player, regardless of which symbol display position that symbol is located at (i.e., the gaming system associates all instances of a specific symbol with the player).

In one embodiment, the quantity of primary game symbols associated with a player is the same for each occurrence of a community game eligibility event. In another embodiment, the quantity of primary game symbols associated with a player is different for each of a plurality of occurrences of a community game eligibility event. In another embodiment, the quantity of primary game symbols associated with a player is different for each occurrence of a community game eligibility event.

In one embodiment, the gaming system associates one player to one, more or each of the primary game symbols. In another embodiment, the gaming system associates a plurality of players to one, more or each of the primary game symbols. In one embodiment, the quantity of players associated with a primary game symbol is the same for each primary game symbols. In another embodiment, the quantity of players associated with a primary game symbol is different for each of a plurality of primary game symbols. In another embodiment, the quantity of players associated with a primary game symbol is different for each primary game symbol.

In one embodiment, upon an occurrence of a community game eligibility event associated with a player, the quantity of primary game symbols associated with the player is based on one or more factors related to the player or the player's gaming experience. In one such embodiment, the greater the player's wager, the greater the quantity of primary game symbols associated with the player upon an occurrence of a community game eligibility event associated with the player. In another such embodiment, the higher a player's player tracking status, the greater the quantity of primary game symbols associated with the player upon an occurrence of a community game eligibility event associated with the player.

In one such embodiment wherein the gaming system associates a player with a plurality of primary game symbols, the gaming system determines one or more features of a community game based on the quantity of primary game symbols associated with the same player included in a community game triggering symbol combination. In one such embodiment, if the gaming system randomly generates a plurality of primary game symbols associated with a single player in a play of a primary game and the generation is associated with a triggering of the community game, the gaming system modifies any determined community game award for that player based on the generation of such primary game symbols associated with the player. For example, the gaming system modifies any community game award by a modifier of 1× if a generated community game triggering symbol combination includes one primary game symbol associated with a player and the gaming system modifies any community game award by a modifier of 2× if a generated community game triggering symbol combination includes two primary game symbols associated with the same player.

In another embodiment wherein gaming system determines one or more features of a community game based on the quantity of primary game symbols associated with the same player included in a community game triggering symbol combination, if a player is associated with a plurality of primary game symbols and one or more of such primary game symbols are included in a generated community game triggering symbol combination, then the gaming system increases that player's probability of winning in the triggered community game. For example, if the triggered community game is a competition racing game, for each primary game symbol associated with a player which is included in the community game triggering symbol combination, that player has a car in the race. In this example, if a player's face appears on two primary game symbols which are part of the community game triggering symbol combination, that player would have two cars in the race, while other players may only have one car each. In this example, by having two cars in the race, the player has higher odds to finish first. In another embodiment, the competition community game includes different awards for how each player performs in the competition community game. Continuing with the competition racing game example above, if there are awards for the first, second, and third place cars, the player with multiple cars competing in the race could possibly win multiple awards in the race when other players can win at most one award.

In one another embodiment wherein the gaming system determines one or more features of a community game based on the quantity of primary game symbols associated with the same player included in a community game triggering symbol combination, the gaming system causes the player associated with the highest number of primary game symbols to be given an advantage in the triggered community game. For example, if there are a series of awards available in the triggered community game, the gaming system enables the player associated with the highest number of primary game symbols in the community game triggering symbol combination to pick first. In one embodiment, this advantage corresponds to a higher average expected payout in the play of the community game for the player associated with the highest number of primary game symbols in the community game triggering symbol combination. In another embodiment, this advantage does not correspond to any higher average expected payout in the play of the community game for the player associated with the highest number of primary game symbols in the community game triggering symbol combination.

In one embodiment, as described above, if the gaming system generates a community game triggering symbol combination, the gaming system enables any players associated with the primary game symbols of such a community game triggering symbol combination to participate in the community game. In another embodiment, if the gaming system generates a community game triggering symbol combination, the gaming system enables any players associated with any generated primary game symbols to participate in the community game. In another embodiment, if the gaming system generates a community game triggering symbol combination, the gaming system enables any players associated with any generated primary game symbols in any winning symbol combination to participate in the community game. In another embodiment, if the gaming system generates a community game triggering symbol combination, the gaming system enables any players associated with any generated primary game symbols in any losing symbol combination to participate in the community game. In another embodiment, if the gaming system generates a community game triggering symbol combination, the gaming system enables any players associated with any primary game symbols generated on a designated reel to participate in the community game. In another embodiment, if the gaming system generates a community game triggering symbol combination, the gaming system enables any players associated with any primary game symbols generated in a designated symbol display position to participate in the community game. In another embodiment wherein an EGM simultaneously or overlapping displays a plurality of primary games, the gaming system enable any players associated with any primary game symbols generated in any of the simultaneously or overlappingly played games to participate in a community game. For example, if four primary games are being simultaneously or overlappingly played by a player and a community game triggering symbol combination involving player N's symbol occurred in game N, then the triggered community game would include player N.

In another embodiment, the gaming system requires that a player has a quantity of accumulated symbols to trigger the community game. In this embodiment, each accumulated symbol is associated with another player. If a player stops playing, their accumulated symbols (stored on other player's games) become generic symbols. Accordingly, certain players may want to keep playing if they know their associated symbols have been accumulated by several other players. In this embodiment, when a designated quantity of symbols are accumulated by a player, the gaming system triggers the community game for that player and enables all other players associated with accumulated symbols to also participate in the community game. At the conclusion of the community game, the gaming system clears the accumulator of the player who triggered the community game.

In one embodiment, a probability that a primary game symbol associated with a player will be generated in association with a play of a primary game is based on one or more factors related to the player or the player's gaming experience. In one such embodiment, the greater the player's wager, the greater the probability that a primary game symbol associated with the player will be generated in association with a play of a primary game. In another such embodiment, the higher a player's player tracking status, the greater the probability that a primary game symbol associated with the player will be generated in association with a play of a primary game. In another embodiment, a probability that a primary game symbol associated with a player will be generated in association with a play of a primary game is based on a progressive meter associated with the player (e.g., a probability meter of a primary game symbol associated with a player accumulates with more play, increasing the likelihood of the appearance of the corresponding symbol in another play of the primary game). In this embodiment, the gaming system resets the probability meter to an initial value after a community game is triggered based on the increased probability.

In another embodiment, when the gaming system associates a player with a primary game symbol of a primary game, the gaming system replaces an existing symbol of the primary game with the primary game symbol associated with the player. In one such embodiment, if the primary game symbols associated with the players are community game triggering symbols, then such association increases the probability of triggering the community game. In another embodiment, when the gaming system associates a player with a primary game symbol of a primary game, the gaming system adds such primary game symbols to the set of primary game symbols available for a play of that primary game. In one such embodiment, if the primary game symbols associated with the players are community game triggering symbols, to account for the addition of one or more player associated primary game symbols in a play of a primary game, the gaming system increases the quantity of community game non-triggering symbols to maintain the same probability of triggering the community game. That is, as more players play the EGMs and more primary game symbols are associated with triggering the community game (by being associated with various players), the gaming system compensates for such increased quantity of community game triggering symbols by also increasing the quantity of community game non-triggering symbols available to be generated.

In one embodiment wherein one or more primary game symbols associated with a player are included in the set of symbols available for a play of a primary game by that player, if the gaming system randomly generates one or more primary game symbols associated with that player in a play of a primary game, the gaming system determines one or more additional features for that player. In one such embodiment, if the gaming system randomly generates one or more primary game symbols associated with that player in a play of a primary game and the generation is associated with a triggering of the community game, the gaming system modifies any determined community game award for that player based on the generation of such primary game symbols associated with the player.

In another embodiment, if the gaming system generates a symbol combination including a primary game symbol associated with a player; the gaming system increments one or more progressive awards available to be won by that associated player. In another embodiment, if the gaming system generates a symbol combination including a primary game symbol associated with a player, the gaming system triggers a wheel game wherein the quantity of segments or slices of the wheel is associated with one or more players. For example, if EGM 1 (played by player 1) generates a symbol combination with symbols associated with players 2 and 3, then the wheel game is triggered with Player 1 associated with 6 slices on a wheel and Players 2 and 3 each associated with 3 slices of the wheel. In this wheel game, the gaming system spins the wheel spins at least once and awards a prize to any player associated with the selected slice(s).

In another embodiment, if the gaming system generates a community game triggering symbol combination, the gaming system triggers the community game and enables each of the players to participate in the triggered community game. In this embodiment, the gaming system determines one or more additional or bonus features of the community game for the players associated with the primary game symbols included in the community game triggering symbol combination. In one such embodiment, if the gaming system randomly generates one or more primary game symbols associated with one or more players in a play of a primary game and the generation is associated with a triggering of the community game, the gaming system modifies any determined community game award for such one or more players based on the generation of such primary game symbols associated with such player. In another such embodiment, if the gaming system randomly generates one or more primary game symbols associated with one or more players in a play of a primary game and the generation is associated with a triggering of the community game, the gaming system causes such players play of the community game to be associated with one or more wild symbols.

In another embodiment, rather than, as described above, determining which players participate in a community game based on which players, if any, are associated with the primary game symbols of the community game triggering symbol combination, if a community game triggering event occurs, the gaming system displays a player participation selector to one or more players. The player participation selector includes each of the primary game symbols which are associated with a player. In this embodiment, the gaming system utilizes the player participation selector to pick one or more of such primary game symbols and thus pick one or more of the associated players to participate in the triggered community game. For example, if a community game triggering event occurs (such as based on a displayed event in a play of a game or independent of any displayed event in a play of a game), the gaming system displays a player participation reel or wheel. Each symbol display position of the player participation reel or wheel includes a symbol which is associated with a player. In operation of this example, the gaming system spins the player participation reel or wheel to select one or more of such symbols and thus selection one or more of the players to participate in the triggered community game. In different embodiments, the quantity of symbols selected (and thus the quantity of players selected to participate in the community game) is based on the total quantity of players currently associated with symbols available to be selected.

In one embodiment, if a player stops or ceases being eligible to participate in the community game, the gaming system disassociates that player from any primary game symbols. In one such embodiment, if a community game eligibility event occurs when a player submits (such as inserting) a player tracking card or inputs other identification into the gaming device, the gaming system disassociates that player from any primary game symbols when the player removes the player tracking card. In another embodiment, if a community game eligibility event occurs when a player places a wager on a play of a primary game, the gaming system disassociates that player from any primary game symbols when the player ceases to make any wagers for a designated period of time. In another embodiment, if a community game eligibility event occurs when the gaming system determines an active status associated with the player, the gaming system disassociates that player from any primary game symbols when the gaming system determines an inactive status associated with the player.

It should be appreciated that while the present disclosure is described in respect to associating a primary game symbol with a player, certain of the embodiments described herein may be employed with respect to associating a primary game symbol with an EGM. In such embodiments, wherein the identity of a player playing at least one primary game of an EGM is unknown or otherwise anonymous, upon an occurrence of the community game eligibility event associated with such an unknown player, the gaming system associates at least one of a plurality of different primary game symbols of at least one primary game of at least one of the plurality of EGMs with the EGM currently played by that unknown player. Such embodiments provide that both identified and unidentified players may participate in the community game based on the generation of one or more primary game symbols generated at another EGM.

In another embodiment, as mentioned above, a community game eligibility event associated with a player occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a community game eligibility event associated with a player to occur.

In another embodiment, as also mentioned above, the gaming system does not provide any apparent reasons to the players for a community game eligibility event associated with a player to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, a community game eligibility event associated with a player occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a community game eligibility event associated with a player occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a community game eligibility event associated with a player occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a community game eligibility event associated with a player occurs, based on a quantity of games played. In this embodiment, a quantity of games played is set for when one or more of such events or conditions will occur. In one embodiment, such a set quantity of games played is based on historic data.

In another alternative embodiment, a community game eligibility event associated with a player occurs, based on time. In this embodiment, a time is set for when one or more of such events or conditions will occur. In one embodiment, such a set time is based on historic data.

In another alternative embodiment, a community game eligibility event associated with a player occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a community game eligibility event associated with a player occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occurs may be the same as, substantially the same as, or different than the criteria for determining whether a player is in active status or inactive status for another one of such events to occur.

In another alternative embodiment, a community game eligibility event associated with a player occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a community game eligibility event associated with a player to occur may be implemented in accordance with the gaming system and method disclosed herein.

It should be appreciated that any of the above-described community game eligibility events associated with a player may be combined in one or more different embodiments.

Alternative Embodiments

It should be appreciated that in different embodiments, one or more of:
  i. when a community game eligibility event associated with a player occurs;
  ii. a quantity of primary game symbols to associate with a player upon an occurrence of a community game eligibility event associated with the player;
  iii. which primary game symbols to associate with a player upon an occurrence of a community game eligibility event associated with the player;
  iv. a duration each primary game symbol remains associated with a player; and
  v. any determination disclosed herein;
  is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an Internet or an intranet. In certain such embodiments, an Internet browser of the EGM is usable to access an Internet game page from any location where an internet connection is available. In one such embodiment, after the Internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
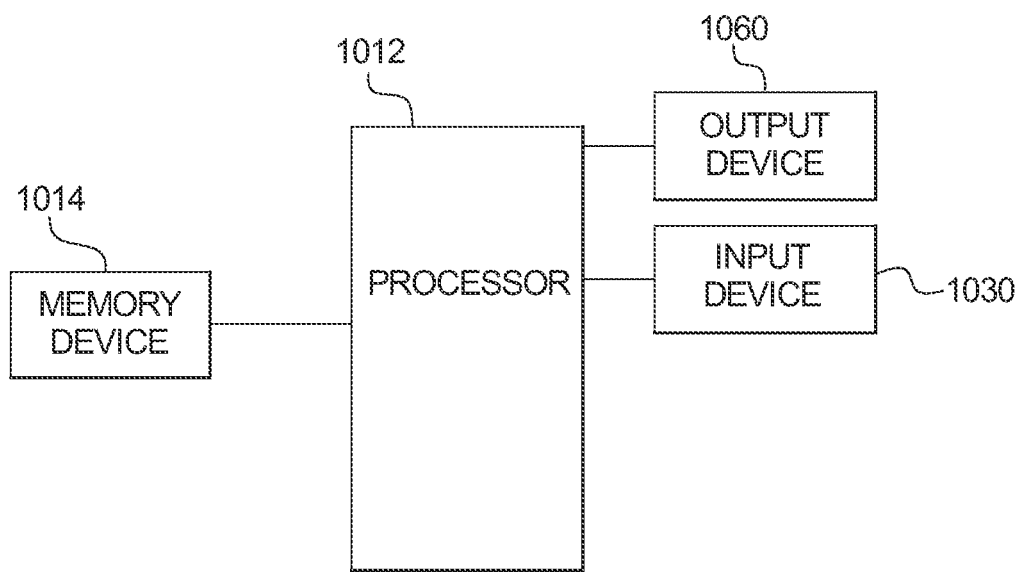
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferro-electric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
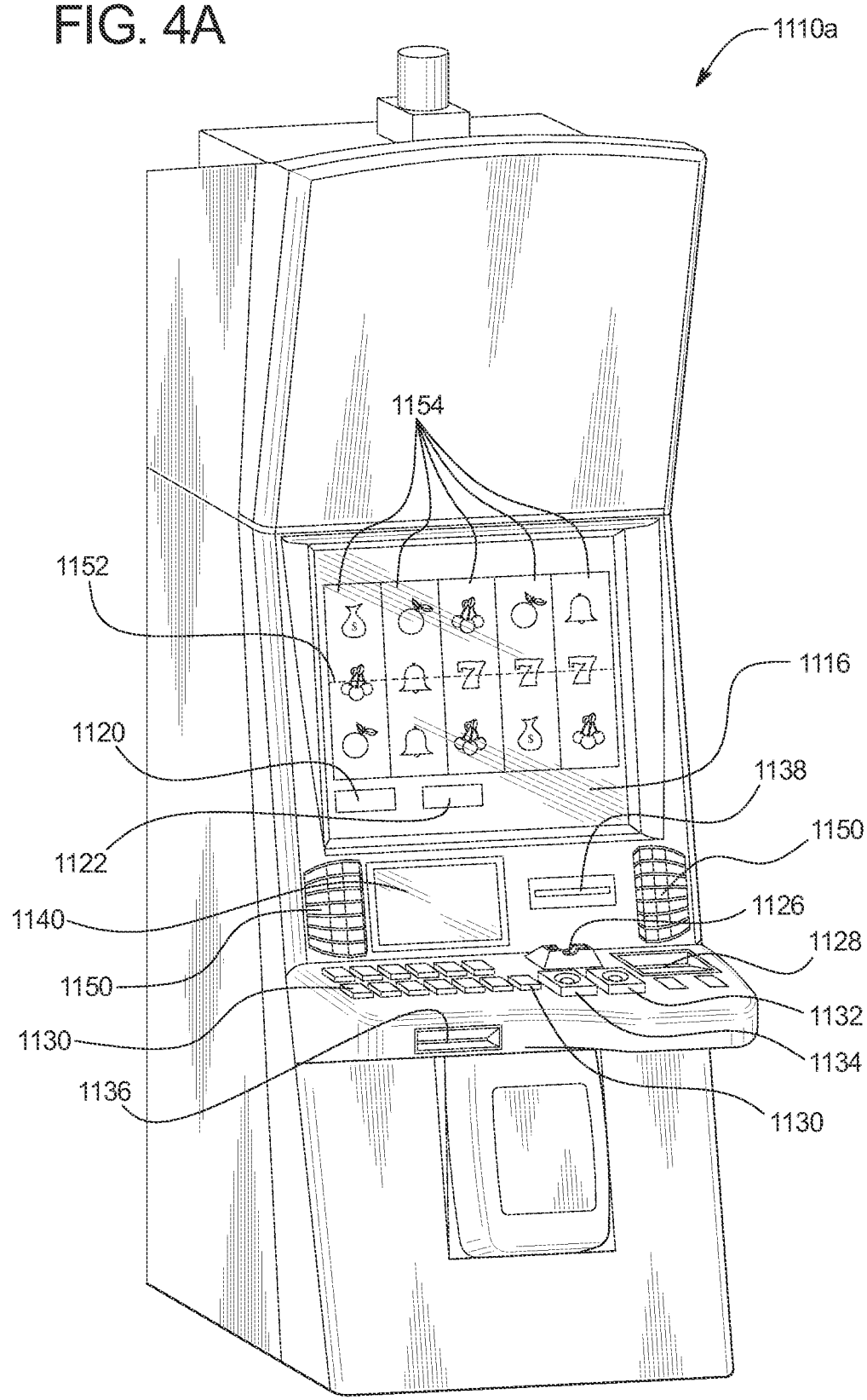
FIGS. 4A and 4B are perspective views of example alternative embodiments of the gaming system disclosed herein.
Figure 4B:
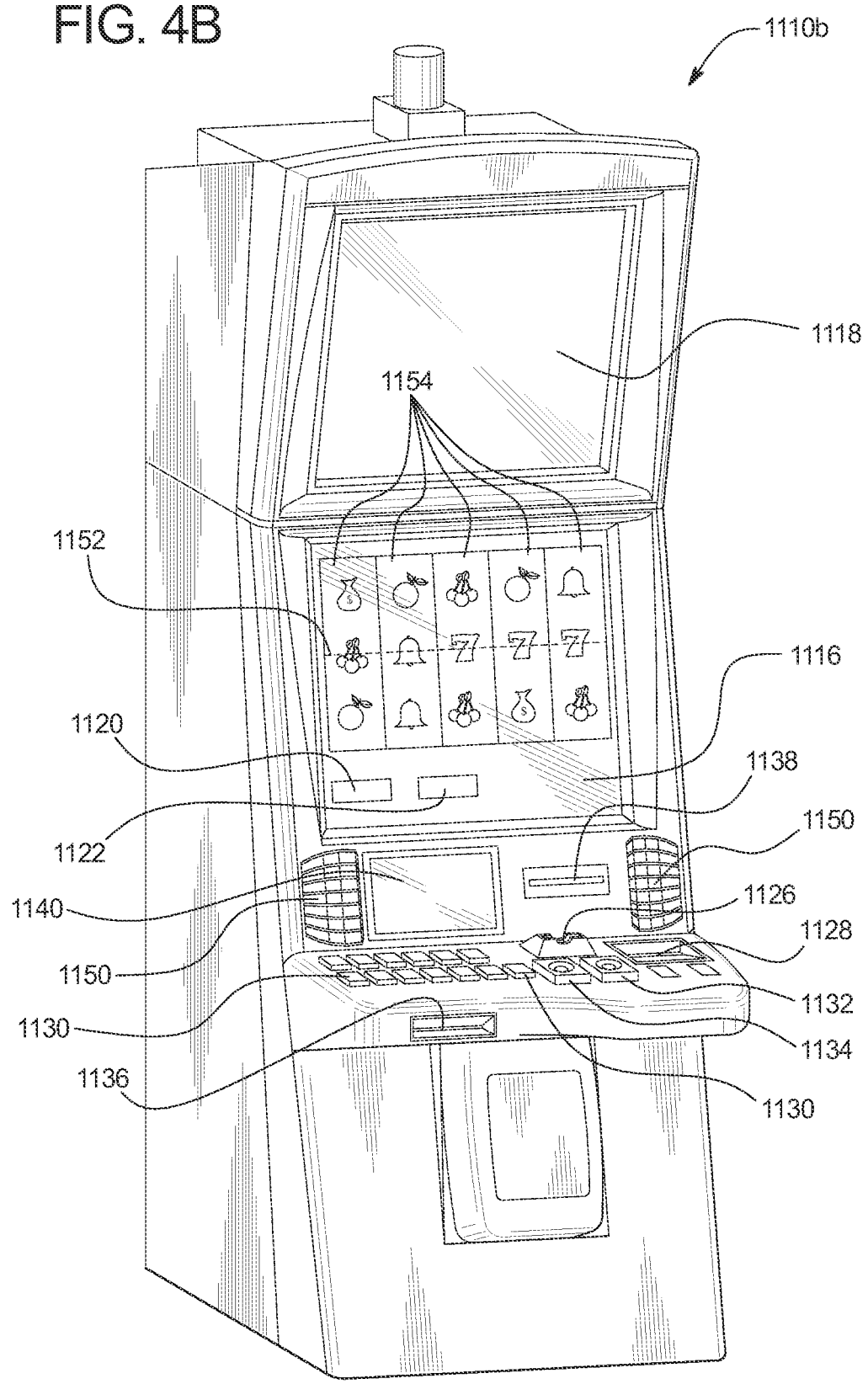

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example. EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or
Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaining system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaining session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
a housing;
a plurality of input devices supported by the housing, said plurality of input devices including:
  (i) an acceptor, and
  (ii) a cashout device;
at least one display device supported by the housing;
at least one processor; and
at least one memory device which stores a plurality of instructions, which when executed by the at least one processor, cause the at least one processor to operate with the at least one display device and the plurality of input devices to:
  (a) if a physical item is received via the acceptor, establish a credit balance based, at least in part, on a monetary value associated with the received physical item, wherein said physical item is selected from the group consisting of: a ticket associated with the monetary value and a unit of currency,
  (b) for a play of a game:
    (i) randomly generate a plurality of game symbols,
    (ii) display the generated game symbols to a first player,
    (iii) determine any game awards associated with the generated game symbols, and
    (iv) display any determined game awards to the first player, wherein the credit balance is increasable based on any displayed determined game awards,
  (c) if the generated game symbols are associated with a community game triggering event and the generated game symbols are not associated with any players, display a first play of a community game, wherein the first player participates in the first play of the community game,
  (d) if the generated game symbols are associated with the community game triggering event and at least one of the generated game symbols is associated with a second, different player, independent of any game symbols generated for a play of a game by the second, different player, display a second play of the community game, wherein the first player and the second player each participate in the second play of the community game, and
  (e) if a cashout input is received via the cashout device, cause an initiation of any payout associated with the credit balance.

2. The gaming system of claim 1, wherein when executed by the at least one processor if the generated game symbols are associated with the community game triggering event and at least one of the generated game symbols is associated with a third, different player, the plurality of instructions cause the at least one processor to, display a third play of the community game, wherein the first player, the second player and the third player each participate in the third play of the community game.

3. The gaming system of claim 1, wherein when executed by the at least one processor, the plurality of instructions cause the at least one processor to associate at least one of the game symbols with the second player upon an occurrence of a community game eligibility event associated with the second player.

4. The gaming system of claim 1, wherein if the first player is associated with first player tracking status, the game is associated with a first probability of the generated game symbols being associated with the community game triggering event and if the first player is associated with second, different player tracking status, the game is associated with a second, different probability of the generated game symbols being associated with the community game triggering event.

5. The gaming system of claim 1, wherein the game includes a primary game.

6. The gaming system of claim 1, wherein the play of the game is in association with a placement of a wager by the first player.

7. The gaming system of claim 6, wherein a first amount of the wager placed on the game is associated with a first probability of the generated game symbols being associated with the community game triggering event and a second, different amount of the wager placed on the game is associated with a second, different probability of the generated game symbols being associated with the community game triggering event.

8. A gaming system comprising:
a first gaming machine including at least one first gaming machine display device and a plurality of first gaming machine input devices including a first gaming machine acceptor, and a first gaming machine cashout device, said first gaming machine configured to:
(a) if a physical item is received via the first gaming machine acceptor, establish a credit balance based, at least in part, on a monetary value associated with the received physical item, wherein said physical item is selected from the group consisting of: a ticket associated with the monetary value and a unit of currency,
(b) randomly generate a plurality of game symbols for a play of a game,
(c) display the generated game symbols to a first player,
(d) determine any game awards associated with the generated game symbols,
(e) display any determined game awards to the first player, wherein the credit balance is increasable based on any displayed determined game awards,
(f) if the generated game symbols are associated with a community game triggering event, enable the first player to participate in a play of a community game, and
(g) if a cashout input is received via the first gaming machine cashout device, cause an initiation of any payout associated with the credit balance; and
a second gaming machine including at least one second gaming machine input device and at least one second gaming machine display device, said second gaming machine configured to, if a second, different player is associated with at least one of the generated game symbols associated with the community game triggering event, independent of any game symbols generated by the second gaming machine for any plays of any games, enable the second player to participate in the play of the community game.

9. The gaming system of claim 8, which includes a third gaming machine including at least one third gaming machine input device and at least one third gaming machine display device, said third gaming machine configured to, if a third, different player is associated with at least one of the generated game symbols associated with the community game triggering event, enable the third player to participate in the play of the community game.

10. The gaming system of claim 8, wherein the second gaming machine is configured to associate at least one of the game symbols with the second player upon an occurrence of a community game eligibility event associated with the second player.

11. The gaming system of claim 8, wherein the second gaming machine is configured to associate a plurality of the game symbols with the second player upon an occurrence of a community game eligibility event associated with the second player.

12. The gaming system of claim 8, wherein the game includes a primary game.

13. The gaming system of claim 8, wherein the play of the game is in association with a placement of a wager by the first player.

14. A gaming system comprising:
a housing;
a plurality of input devices supported by the housing, said plurality of input devices including:
(i) an acceptor, and
(ii) a cashout device;
at least one display device supported by the housing;
at least one processor; and
at least one memory device which stores a plurality of instructions, which when executed by the at least one processor, cause the at least one processor to operate with the at least one display device and the plurality of input devices to:
(a) if a physical item is received via the acceptor, establish a credit balance based, at least in part, on a monetary value associated with the received physical item, wherein said physical item is selected from the group consisting of: a ticket associated with the monetary value and a unit of currency,
(b) for a play of a game:
(i) randomly generate a plurality of game symbols,
(ii) display the generated game symbols to a first player,
(iii) determine any game awards associated with the generated game symbols, and
(iv) display any determined game awards to the first player, wherein the credit balance is increasable based on any displayed determined game awards,
(c) if the generated game symbols are associated with a community game triggering event and the generated game symbols are not associated with any gaming machines, display a first play of a community game, wherein the first player at a first gaming machine participates in the first play of the community game,
(d) if the generated game symbols are associated with the community game triggering event and at least one of the generated game symbols is associated with a second, different gaming machine, independent of any game symbols generated by the second, different gaming machine for any plays of any games, display a second play of the community game, wherein the first player at the first gaming machine and a second player at the second gaming machine each participate in the second play of the community game, and
(e) if a cashout input is received via the cashout device, cause an initiation of any payout associated with the credit balance.

15. The gaming system of claim 14, wherein when executed by the at least one processor if the generated game symbols are associated with the community game triggering event and at least one of the generated game symbols is associated with a third, different gaming machine, the plurality of instructions cause the at least one processor to, display a third play of the community game, wherein the first player at the first gaming machine, the second player at the second gaming machine and a third player at the third gaming machine each participate in the third play of the community game.

16. The gaming system of claim 14, wherein when executed by the at least one processor, the plurality of instructions cause the at least one processor to associate at least one of the game symbols with the second gaming machine upon an occurrence of a community game eligibility event associated with the second gaming machine.

17. The gaming system of claim 14, wherein the game includes a primary game.

18. The gaming system of claim 14, wherein the play of the game is in association with a placement of a wager.

19. The gaming system of claim 18, wherein a first amount of the wager placed on the game is associated with a first probability of the generated game symbols being associated with the community game triggering event and a second, different amount of the wager placed on the game is associated with a second, different probability of the generated game symbols being associated with the community game triggering event.

20. A gaming system comprising:
a first gaming machine including at least one first gaming machine display device and a plurality of first gaming machine input devices including a first gaming machine acceptor, and a first gaming machine cashout device, said first gaming machine configured to:
(a) if a physical item is received via the first gaming machine acceptor, establish a credit balance based, at least in part, on a monetary value associated with the received physical item, wherein said physical item is selected from the group consisting of: a ticket associated with the monetary value and a unit of currency,
(b) randomly generate a plurality of game symbols for a play of a game,
(c) display the generated game symbols to a first player,
(d) determine any game awards associated with the generated game symbols,
(e) display any determined game awards to the first player, wherein the credit balance is increasable based on any displayed determined game awards,
(f) if the generated game symbols are associated with a community game triggering event, enable the first player at the first gaming machine to participate in a play of a community game, and
(g) if a cashout input is received via the first gaming machine cashout device, cause an initiation of any payout associated with the credit balance; and
a second gaming machine including at least one second gaming machine input device and at least one second gaming machine display device, said second gaming machine configured to, if the second gaming machine is associated with at least one of the generated game symbols associated with the community game triggering event, independent of any game symbols generated by the second gaming machine for any plays of any games, enable a second, different player at the second gaming machine to participate in the play of the community game.

21. The gaming system of claim 20, which includes a third gaming machine including at least one third gaming machine input device and at least one third gaming machine display device, said third gaming machine configured to, if the third gaming machine is associated with at least one of the generated game symbols associated with the community game triggering event, enable a third, different player at the third gaming machine to participate in the play of the community game.

22. The gaming system of claim 20, wherein the second gaming machine is associated with at least one of the game symbols upon an occurrence of a community game eligibility event associated with the second gaming machine.

23. The gaming system of claim 20, wherein the second gaming machine is associated with a plurality of the game symbols upon an occurrence of a community game eligibility event associated with the second gaming machine.

24. The gaming system of claim 20, wherein the game includes a primary game.

25. The gaming system of claim 20, wherein the play of the game is in association with a placement of a wager.

26. The gaming system of claim 1, wherein the display of the second play of the community game occurs independent of any game symbols generated for any plays of any games by the second, different player.

* * * * *